United States Patent [19]

Adkison

[11] Patent Number: 5,626,477
[45] Date of Patent: May 6, 1997

[54] EDUCATION SYSTEM

[76] Inventor: Joan F. Adkison, Rte. 5 Box 24, Havana, Fla. 32333

[21] Appl. No.: 535,470

[22] Filed: Sep. 28, 1995

[51] Int. Cl.⁶ .................... A63F 3/00; G09B 1/06
[52] U.S. Cl. .................... 434/128; 273/273; 434/259
[58] Field of Search .................... 434/128, 129, 434/170, 171, 259, 258; 446/85, 125; 273/157 R, 273

[56] References Cited

U.S. PATENT DOCUMENTS

| | | | |
|---|---|---|---|
| 2,659,163 | 11/1953 | Albee | 434/259 |
| 3,649,024 | 3/1972 | Katzman | 273/273 |
| 3,892,409 | 7/1975 | Herbert, Jr. | 273/273 |
| 3,909,003 | 9/1975 | Rabinovich | 273/273 |
| 4,149,717 | 4/1979 | Seijiro | 273/157 R |
| 4,163,560 | 8/1979 | Solomon | 434/259 |
| 4,797,103 | 1/1989 | Pittman | 434/211 |
| 4,822,051 | 4/1989 | Nowak et al. | 273/157 R |
| 4,838,551 | 6/1989 | Volpert | 273/157 R |
| 4,848,768 | 7/1989 | Barlow | 273/273 |
| 4,952,153 | 8/1990 | McAllister | 434/259 |

Primary Examiner—Paul J. Hirsch
Attorney, Agent, or Firm—Peter Loffler

[57] ABSTRACT

An education system for teaching young children basic shapes, colors, numbers, letters and words is disclosed. The system is comprised of three board-game components. The first component teaches basic shapes and colors, the second component teaches numbers and colors and the third component teaches numbers, letters, and words.

7 Claims, 5 Drawing Sheets

FIG. 6

EDUCATION SYSTEM

BACKGROUND OF THE INVENTION

1. Field of the Invention

The present invention relates an education system and more specifically to an educational system that teaches preschoolers, letters, numbers, colors, and words in a game environment.

2. Background of the Prior Art

Most parents recognize that learning is the key to success in life and that proper learning begins very early in life. Therefore, most parents begin their children's life-long learning process long before the children enter kindergarten.

In order to effectively educate a young child, the learning process must be fun. By making the process enjoyable, the child's relatively short attention span is greatly extended. By combining the educational process into a game, the chances for successful teaching are greatly enhanced.

Therefore, there is a need for an education system for a young child that teaches the child basic numbers, letters, words, shapes, and colors. Such a system should be in a game form that is fun and enjoyable for the child to use. Preferably, such a system should be relatively simple and inexpensive to manufacture.

SUMMARY OF THE INVENTION

The present invention meets the aforementioned need in the art for an education system that is provided in game form. The present invention is designed to teach a child basic shapes, colors, numbers, letters and words. The education system of the present invention is simple and fun to use and is relatively simple and inexpensive to produce.

The present invention is divided into three components. The first component teaches shapes and colors and is comprised of a playing board divided into a plurality of identically detailed sections. Each section has a plurality of different basic shaped outlines thereon. A plurality of sets of blocks, each set having blocks in corresponding shapes to the outlines, is provided. Each set is provided in a different color. A spinner, with a plurality of landing spaces, each landing space in one of the provided colors of blocks, is also provided.

Each child is assigned a section on the board and is given one set of blocks. The spinner is spun and the child whose color of blocks matches the color of the landed upon space of the spinner selects one of his blocks, announces the shape and color of the block and places the block on the corresponding outline on his assigned section. The child who places all his blocks onto his section wins.

The second component teaches numbers and colors and is comprised of a playing boarded divided into a plurality of identically detailed sections. Each section has a plurality of identically-shaped outlines thereon. Each outline has a different number thereon. A plurality of sets of blocks in corresponding shape to the outlines, is provided. Each set is provided in a different color. A spinner, with a plurality of landing spaces, each landing space in one of the provided colors of blocks, is also provided.

Each child is assigned a section on the board and is given one set of blocks. The spinner is spun and the child whose color of blocks matches the color of the landed upon space of the spinner selects one of his blocks, announces the color and number of the block and places the block on the corresponding numbered outline on his assigned section. The child who places all his blocks onto his section wins.

The third component teaches letters, basic words, and numbers and is comprised of a playing boarded divided into a plurality of differently detailed sections. Each section has a plurality of boxes located thereon. Each box has a letter, a word that begins with that letter and a pictorial representation of that word, or a number or numbers, located thereon. A plurality of cards, one card is provided for each of the plurality of boxes and each card is identically detailed with the corresponding box.

Each child is assigned a section on the board and is given several cards with the remaining cards placed onto a pile. If a card the child possesses matches one of the boxes in the child's assigned section, the child may place the card on top of the corresponding box by pronouncing the letter and word (or number or numbers) on the card. Thereafter, each child takes turns drawing from the pile and attempts to make a match. After the pile is completely drawn, the children ask each other for a required card, each request must be by letter and word of the desired card (or number or numbers). The child who fills up his section first wins.

BRIEF DESCRIPTION OF THE DRAWINGS

Figure 6:
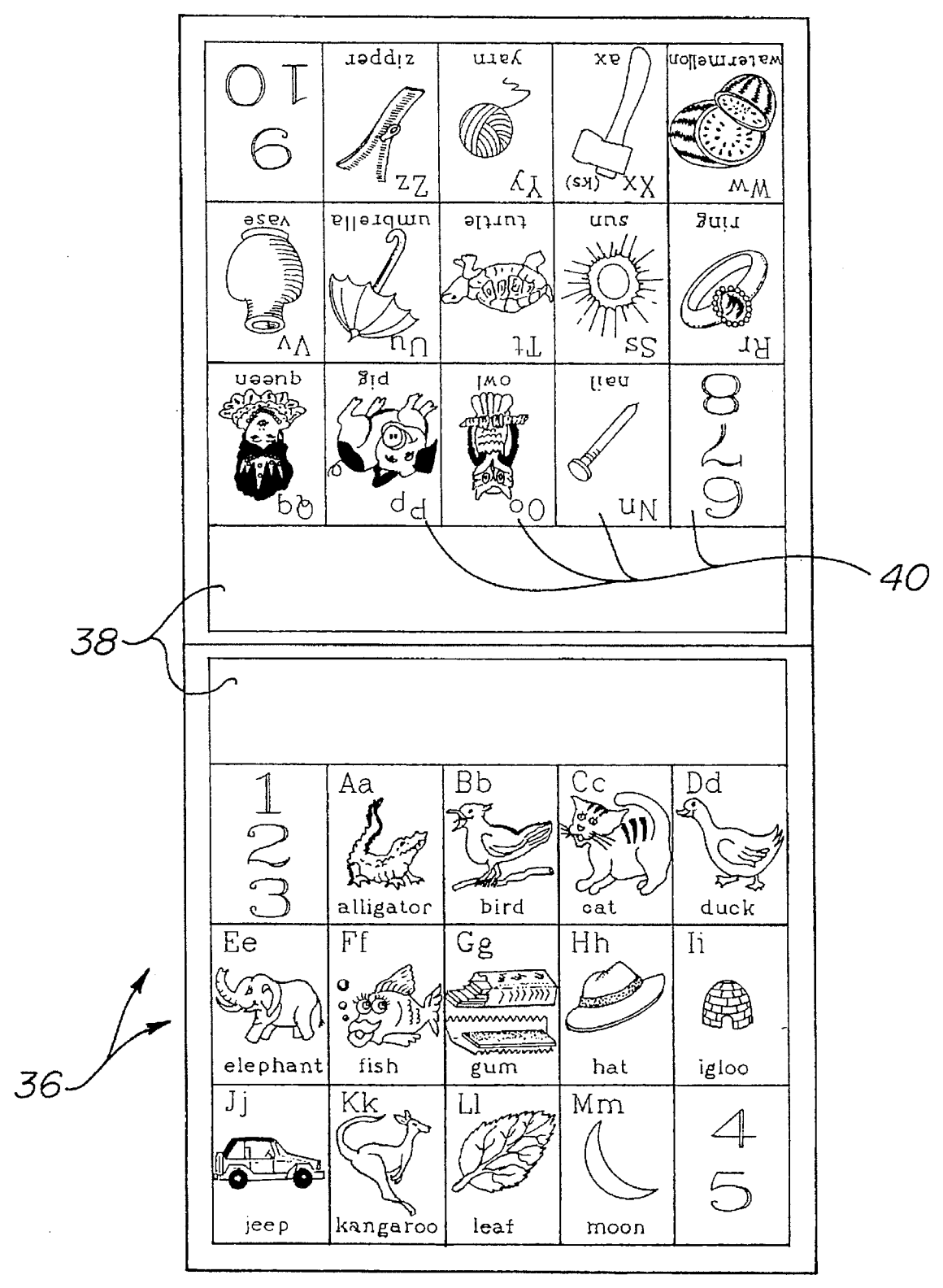

FIG. 6 is a top plan view of the third playing board of the present invention.

DETAILED DESCRIPTION OF THE PREFERRED EMBODIMENT

Figure 1:
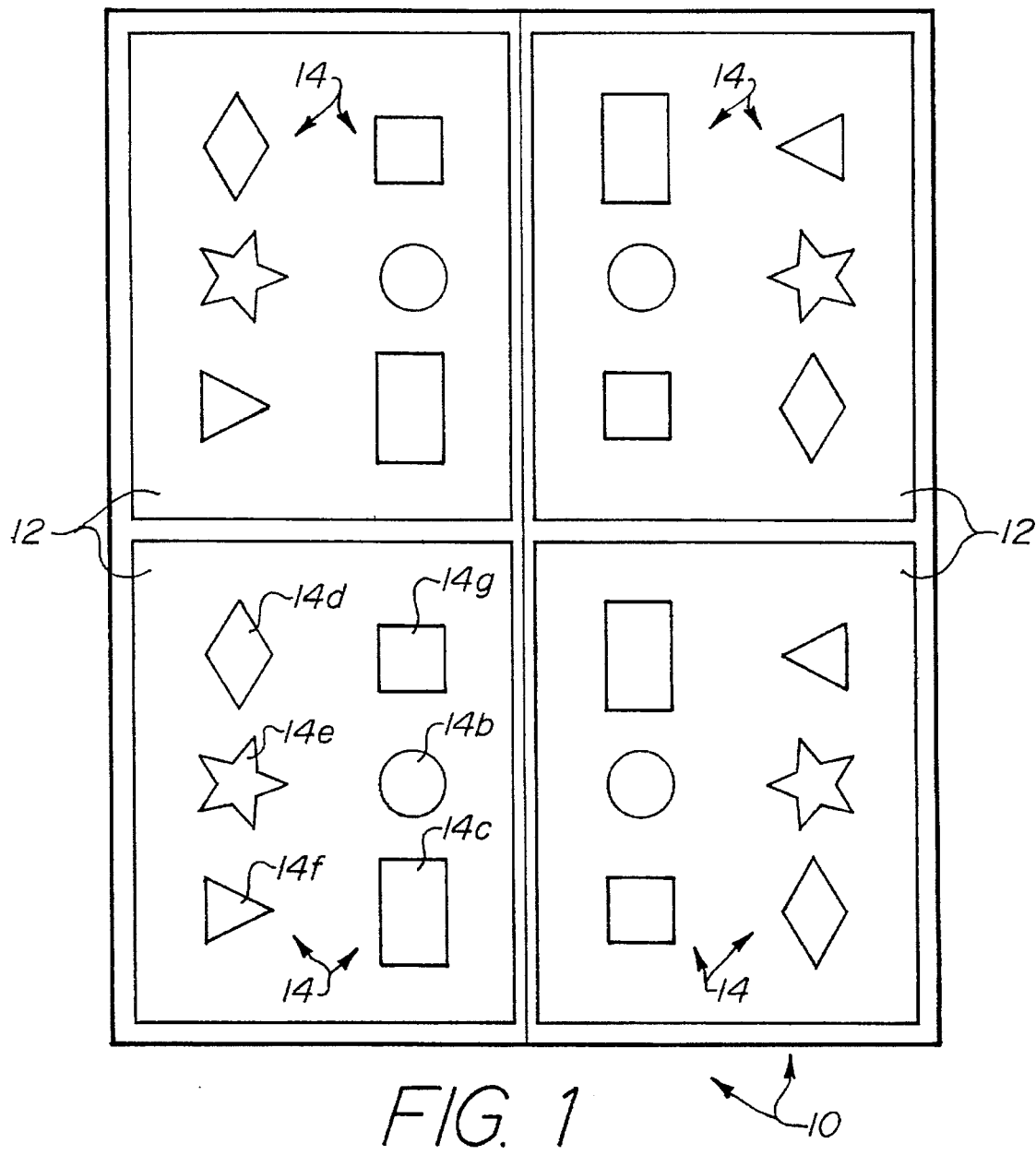
FIG. 1 is a top plan view of the first playing board of the present invention.
Figure 2:
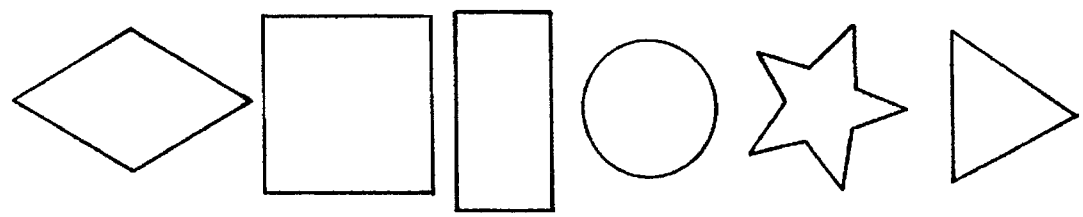
FIG. 2 is a perspective view of the first set of blocks of the present invention.

The education system of the present invention has three components with the first component comprising a first playing board 10. As seen in FIG. 1, the playing board 10 is divided into four identically detailed quadrants 12. Displayed on each quadrant 12 are six shapes 14: a square 14a, a circle 14b, a rectangle 14c, a diamond 14d, a star 14e, and a triangle 14f, it being expressly recognized that other shapes can be used. A set of blocks 16 in six shapes, each shape corresponding to one of the shapes of the first playing board 10, is provided. The blocks 16 can be made in cardboard, wood, plastic, or other similar material. A total of four sets of blocks 16, one set for each quadrant 12 of the first playing board 10 is provided. Each set of blocks 16 is provided in one of four different colors.

A first spinner 18 is also provided. The spinner has a circular portion 20 provided thereon with the circular portion being divided into four equal quarter circle portions 22. Each quarter circle portion 22 is in one of four different colors, each color corresponding to one of the colors provided for the four sets of blocks 16. A spinner arrow 24 is rotationally disposed on the center of the circular portion and is free to spin about the circular portion. Other color selection mechanisms, such as a die, can also be utilized in place of the spinner 18.

This first component of the educational system is concerned with teaching a child various shapes and colors. In order to utilize the first component, one set of blocks 16 is distributed to each child that is playing the game. Each child will have shapes all in one color and each child will have a set of blocks 16 in a different color from the other players and will be assigned to one of the quadrants 12 of the first playing board 10. Although the first component is disclosed with provisions for a four child play capacity, it is expressly understood that the first component may be designed with provisions for fewer or more than a four child capability.

One child begins by spinning the spinner arrow 24. For the color the spinner arrow 24 lands upon, the child whose color of his set of blocks 16 corresponds to the landed upon color chooses one block from that child's available set. The child take the chosen block and thereafter must state the shape and color of the chosen block and can thereafter place the block into the child's quadrant 12 on top of the shape that corresponds to the shape of the block. Thereafter, the child next to the child who first spun the spinner takes his turn by spinning the arrow 24 and begins another round of the game. The child who is first able to place his entire set of blocks 16 onto his quadrant 12 is the winner of the game.

Figure 3:
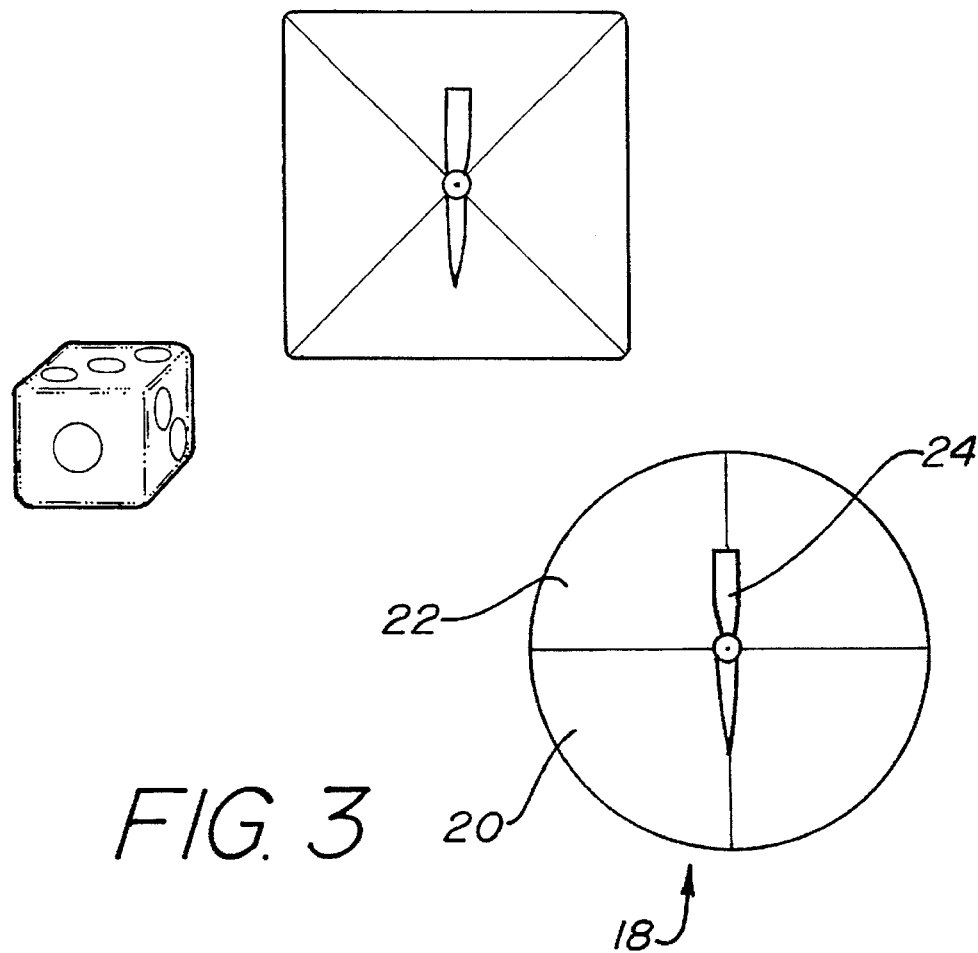
FIG. 3 is a top plan view of the selectors usable with the first and second components of the present invention.
Figure 4:
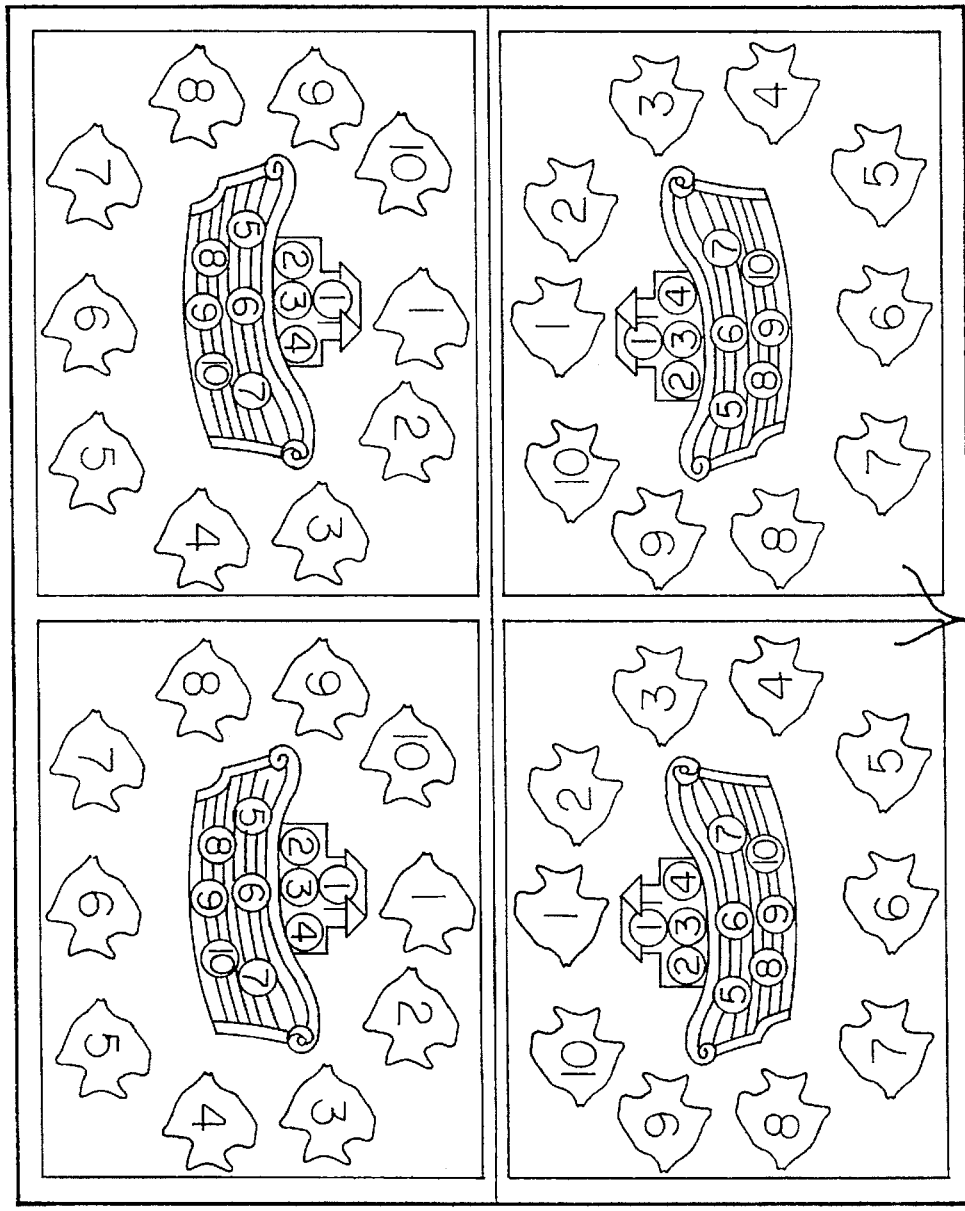
FIG. 4 is a top plan view of the second playing board of the present invention.
Figure 5:
FIG. 5 is a perspective view of the second set of blocks of the present invention.
Figure 7:
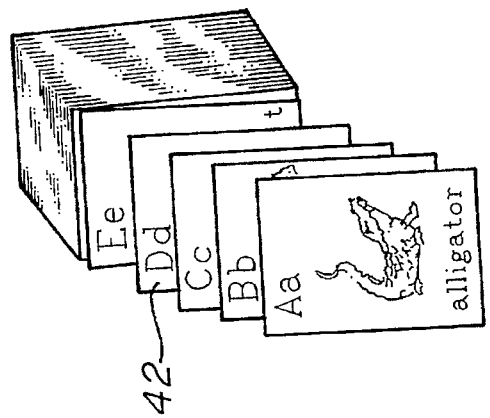
FIG. 7 is a perspective view of the set of cards used with the third playing board.

The second component of the education system of the present invention comprises a second playing board 26. As seen in FIG. 3, the playing board is divided into four identically detailed quadrants 28. Displayed on each quadrant are ten fish-shaped outlines 30. Each fish-shaped outline 30 has a different number from 1 to 10 displayed thereon. Also displayed on each quadrant 28 is a boat 32 with the numbers 1 through ten located thereon. A set of ten fish-shaped blocks 34 is provided. The blocks 34 can be made in cardboard, wood, plastic, or other similar material. A total of four sets of blocks 34, one set for each quadrant 28 of the second playing board 26 is provided. Each set is provided in one of four different colors.

A second spinner 18 is also provided for this second component of the education system. The second spinner is identical to the first spinner 18 described above except that the colors of the second spinner correspond to the colors of the second set of blocks 34. If the colors used for the first component are identical to the colors used for the second component, the spinner 18 from the first component may be used.

This second component of the educational system is concerned with teaching a child various colors and the number 1 through 10. In order to utilize the second component, one set of blocks 34 is distributed to each child that is playing the game. Each child will have shapes all in one color and each child will have a set of blocks in a different color from the other players and will be assigned to one of the quadrants of the second playing board 26. Although the second component is disclosed with provisions for a four child play capacity, it is expressly understood that the second component may be designed with provisions for fewer or more than a four child capability.

One child begins by spinning the spinner arrow 24'. For the color the spinner arrow lands upon, the child whose color of his set of fish-shaped blocks 34 corresponds to landed upon color takes one of his fish-shaped blocks from that child's available set and must state the color and number (if this is the first fish-shaped block the child says "one, " if it is the second fish-shaped block the child says "two, " and so on) of the fish-shaped block and can thereafter place the fish-shaped block onto the child's quadrant 28 on top of the fish-shaped outline on the second paying board 26 that bears the number that corresponds to the number of the fish-shaped block. Thereafter, the child next to the child who first spun the spinner takes his turn by spinning the arrow 24' and begins another round of the game. The child who is first able to place his entire set of fish-shaped blocks 34 onto his quadrant 28 is the winner of the game.

Although fish-shaped blocks 34 have been illustrated for this second component of the education system, it is expressly recognized that blocks of other shapes with corresponding outlines on the playing board can be utilized.

The third component of the education system of the present invention comprises a third playing board 36. As seen in FIG. 3, the playing board 36 is divided into two halves 38. Each half 38 is divided into a plurality of boxes 40. Located in each box 40 is a letter, a word that begins with that letter, and a pictorial representation of that word. Alternately, a number or numbers can be located in each box 40. One half 38 of the board has different words or numbers from the other half.

A set of cards 42 is also provided, one card for each of the boxes 40 located on the third playing board 36. Each card is identically detailed to its corresponding box. Although the third component is disclosed with provisions for a two child play capacity, it is expressly understood that the third component may be designed with provisions for more than a two child capability.

This third component of the educational system is concerned with teaching a child basic words and numbers and their phonetic sounds colors. In order to utilize the third component, each child is dealt several of the cards with the remainder placed in a pile. Each child is assigned a half 38 and thereafter looks at his cards to see if any of the cards match one of the boxes on that child's half 38. If a match is made, the child must state the letter of the card and the word of the card (or number or numbers) and can thereafter place the card onto the box. If some of the cards do not match one of the boxes on that child's half, the child simply retains the card. After all matches have been made by each child, one child draws a card from the pile and attempts to make a match with a box on his half of the board. If a match is made, the child may place the card onto his half in the usual way. If a match is not made, the card is retained. Thereafter, the next child draws a card from the pile and makes the same matching attempt.

After all the cards are drawn from the pile, the children ask each other for a card they need using the letter and word (or number or numbers) in their request. The child who fills his entire half 38 first is the winner.

While the invention has been particularly shown and described with reference to an embodiment thereof, it will be understood by those skilled in the art that various changes in form and detail may be made without departing from the spirit and scope of the invention.

I claim:

1. An education system comprising:
   a playing board divided into a plurality of identically detailed and different colored sections with a plurality of unique shape outlines located in each of the different colored sections;
   a plurality of sets of blocks each set in a color corresponding to one of the colors of the sections, in corresponding number to the number of the sections, each of the set of blocks being in shapes corresponding to the shapes of the outlines; and
   a color selection means.

2. The device as in claim 1 wherein the color selection means comprises a spinner.

3. The device as in claim 1 wherein the color selection means comprises a die.

4. An education system comprising:

a playing board divided into a plurality of identically detailed and different colored sections with a plurality of identically shaped outlines located in each quadrant with each of the identically shaped outlines having a unique positive integer;

a plurality of sets of blocks each set in a color corresponding to one of the colors of the sections, in corresponding number to the number of the sections, each set of blocks being in the shape corresponding to the shape of the outlines;

a color selection means.

5. The device as in claim 4 wherein the color selection means comprises a spinner.

6. The device as in claim 4 wherein the color selection means comprises a die.

7. An education system comprising:

a playing board divided into a plurality of identically detailed and different colored sections;

a plurality of boxed areas located in each section of said sections;

a graphic representation with alternately an unique letter, a word beginning with that letter and an icon of that word or an unique number located in each box;

a plurality of cards in corresponding number to the number of boxes with each card having a graphic representation corresponding to one of the graphic representations located in the boxes.

* * * * *